US012660842B2

(12) United States Patent     (10) Patent No.: US 12,660,842 B2
Sachs et al.                     (45) Date of Patent:     Jun. 23, 2026

(54) SYSTEM AND METHOD FOR ROASTING COFFEE BEANS

(71) Applicant: Puroast Coffee Company, Inc., High Point, NC (US)

(72) Inventors: Kerry M. Sachs, High Point, NC (US); Julio Sachs, High Point, NC (US)

(73) Assignee: PUROAST PATENT HOLDING COMPANY LLC, Miami, FL (US)

( * ) Notice: Subject to any disclaimer, the term of this patent is extended or adjusted under 35 U.S.C. 154(b) by 749 days.

(21) Appl. No.: 17/965,642

(22) Filed: Oct. 13, 2022

(65) Prior Publication Data

US 2023/0117149 A1     Apr. 20, 2023

Related U.S. Application Data

(60) Provisional application No. 63/255,753, filed on Oct. 14, 2021.

(51) Int. Cl.
A23N 12/12     (2006.01)
A23N 12/10     (2006.01)
(52) U.S. Cl.
CPC ........... A23N 12/125 (2013.01); A23N 12/10 (2013.01)
(58) Field of Classification Search
CPC ...... A23N 12/00; A23N 12/08; A23N 12/083; A23N 12/10; A23N 12/12; A23N 12/125; A23F 5/04; A23F 5/046; A23F 5/10
See application file for complete search history.

(56) References Cited

U.S. PATENT DOCUMENTS

| | | | | |
|---|---|---|---|---|
| 4,553,285 A | * | 11/1985 | Sachs | F23J 15/027 |
| | | | | 110/223 |
| 5,287,633 A | * | 2/1994 | Sachs | A23N 12/10 |
| | | | | 426/466 |
| 5,632,098 A | * | 5/1997 | Finch | A47J 37/047 |
| | | | | 99/421 H |
| 6,349,658 B1 | * | 2/2002 | Tyer | F23G 5/002 |
| | | | | 110/235 |
| 2008/0089986 A1 | * | 4/2008 | Song | A23N 12/10 |
| | | | | 426/466 |
| 2010/0003628 A1 | * | 1/2010 | Chung | A23N 12/10 |
| | | | | 432/104 |
| 2014/0314923 A1 | * | 10/2014 | Sewell | A23N 12/08 |
| | | | | 426/233 |

FOREIGN PATENT DOCUMENTS

| | | | | | | |
|---|---|---|---|---|---|---|
| KR | 10-20150130617 A | * | 11/2015 | | ............. | A61K 38/08 |
| KR | 101791800 B1 | * | 10/2017 | | ............. | A23N 12/10 |

* cited by examiner

*Primary Examiner* — Hung D Nguyen
(74) *Attorney, Agent, or Firm* — Shun Yao; Yao Legal Services, Inc.

(57)     ABSTRACT
A coffee roasting system is provided. The system includes a roaster mechanism with a container for accommodating coffee beans. The system also includes a heat source configured to produce heat. The system further includes a heat transfer mechanism comprising a first interface which can be coupled with the heat source and a second interface which can be coupled with the roaster mechanism. The second interface is configured to allow the heat transfer mechanism to be disengaged from the roaster mechanism. In addition, the system includes a control module coupled to the heat source and roaster mechanism and configured to control the heat source and roaster mechanism.

7 Claims, 3 Drawing Sheets

SYSTEM AND METHOD FOR ROASTING COFFEE BEANS

RELATED APPLICATION

This claims the benefit of U.S. Provisional Patent Application No. 63/255,753, entitled "SYSTEM AND METHOD FOR ROASTING COFFEE BEANS," filed Oct. 14, 2021, the disclosure of which is incorporated herein by reference in its entirety for all purposes.

BACKGROUND

Field

This disclosure is generally related to coffee roasting technologies. More specifically, this disclosure is related to a system and method for roasting coffee beans.

Related Art

In recent years, the public has become progressively more health conscious, especially with various types of foods that are consumed daily. Coffee is one of the most widely consumed beverages in the world. In 2020/2021, approximately 166.63 million 60-kilogram bags of coffee were consumed worldwide, an increase from 164 million bags in the previous year. The coffee industry is regularly coming up with innovative new methods for brewing coffee and serving it. Single cup brewers, for example, are a relatively new innovation which offer a quick and mess-free coffee brewing method for serving a single cup of coffee without the hassle of brewing an entire pot. Another example is cold brew coffee, which is made by leaving coffee to brew in cold or room temperature water for 12 to 24 hours. The result is a mellower, less acidic tasting coffee. The popularity of cold brew coffee indicates that the market is becoming more discerning with the taste and acidity level of coffee, as well as the health benefit of various types of coffee beverages.

Although innovations have occurred in coffee brewing methods, the way coffee beans are roasted largely remains the same. The typical coffee bean roasting process is a high-energy-consuming, industrialized process. Majority of the coffee beans on the current market are roasted at a relatively high temperature for a short amount of time, a process that is optimized for volume production.

SUMMARY

One embodiment of the present invention provides a coffee roasting system. The system includes a roaster mechanism with a container for accommodating coffee beans. The system also includes a heat source configured to produce heat. The system further includes a heat transfer mechanism comprising a first interface which can be coupled with the heat source and a second interface which can be coupled with the roaster mechanism. The second interface is configured to allow the heat transfer mechanism to be disengaged from the roaster mechanism. In addition, the system includes a control module coupled to the heat source and roaster mechanism and configured to control the heat source and roaster mechanism.

In a variation of this embodiment, the heat source includes a fuel delivery mechanism configured to regulate a rate at which fuel is delivered into a furnace.

In a further variation, the fuel delivery mechanism includes an auger which can be rotated.

In a variation of this embodiment, the roaster mechanism includes a cylindrical outer shell and cylindrical inner shell. The inner shell is coupled to a motor which is configured to cause the inner shell to rotate. In addition, the motor is controlled by the control module.

In a variation of this embodiment, control module receives one or more telemetry signals from the roaster mechanism, the heat source, or both.

In a variation of this embodiment, the control module includes a communication module configured to couple to a network.

In a further variation, the control module communicates to a server to download a roasting profile, wherein the roasting profile indicates a set of roasting parameters for a roasting process.

In a variation of this embodiment, the coffee beans are roasted for a period greater than 120 minutes, preferably greater than 180 minutes.

In a further variation, the coffee beans exhibit a pH value of 5.3 or higher, preferably 5.5 or higher.

In a further variation, the coffee beans are roasted without adding chemical additives, which include potassium and sodium.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the present invention facilitate a system and method of roasting coffee beans in an energy-efficient manner. The system can be used to produce, with a tight quality control, roasted coffee beans with significantly lower acidity without the use of chemical additives.

Figure 1:
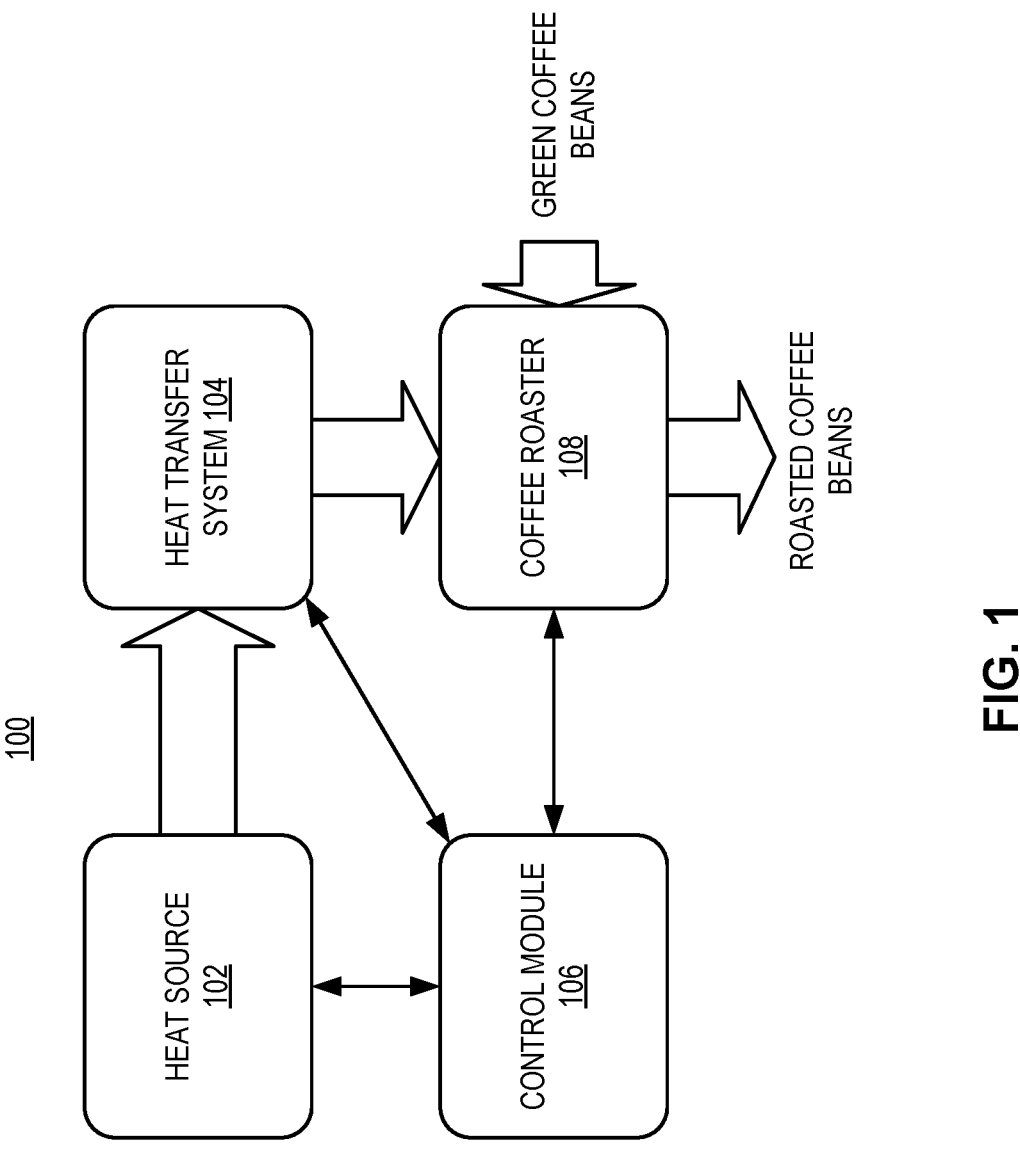
FIG. 1 presents a block diagram of an exemplary coffee bean roasting system, in accordance with one embodiment of the present invention.

FIG. 1 presents a block diagram of an exemplary coffee bean roasting system, in accordance with one embodiment of the present invention. In this example, coffee roasting system 100 can include a heat source 102, which can generate the heat used for roasting the coffee beans. Heat source 102 can be coupled to a heat transfer system 104, which allows the heat generated by heat source 102 to be transferred efficiently to a coffee roaster 108. Also included in coffee roasting system 100 is a control module 106, which is coupled to heat source 102, heat transfer system 104, and coffee roaster 108.

In one embodiment, heat source 102 can have a combustion chamber or furnace configured to facilitate combustion of bio waste material, such as dry leaves, barks, waste paper, and saw dust. The combustion chamber can include a mechanism that can continuously deliver the material to be burned and an air flow regulation mechanism which can control the amount of oxygen entering the combustion chamber. In one embodiment, the rate at which the fuel material is delivered to and travels through the combustion chamber can be controlled by control module 106. For example, a conveyor mechanism with adjustable speed can be used to deliver the fuel material. Furthermore, the rate at which the fuel material is delivered through the combustion chamber and/or the rate at which air is supplied to the combustion chamber can be controlled by control module 106.

Note that various types of heat-generating systems can be used as heat source 102. For example, heat source 102 can generate heat by using electricity, fossil fuel, solar power, or hydraulic power. Correspondingly, control module 106 can work with different types of heat sources to control the amount of heat generated during a coffee roasting process. One type of heat source can be a particulate fuel furnace as disclosed in U.S. Pat. No. 4,553,285, which is incorporated by reference herein.

In some embodiments, heat source 102 can include one or more sensors configured to detect heat-generation related information and transmit such information to control module 106. Such information can include but is not limited to: temperature, temperature differential, pressure, air flow, oxygen level, and amount of energy consumed. Control module 106 can in turn send control signals to heat source 102 to regulate the heat generation process using the information sent by the sensors in heat source 102 and a control software.

Heat transfer system 104 can include a mechanism that directs the heat generated by heat source 102 to coffee roaster 108. In one embodiment, heat transfer system 104 can include a heat duct that couples the output of heat source 102 to a heat-input port of coffee roaster 108. A coupling mechanism can be used to connect heat transfer system 104 and coffee roaster 108. This coupling mechanism can be used to de-couple coffee roaster 108 from the heat transfer system 104, thereby allowing the coffee roasting process to stop without discontinuing the operation of heat source 102. In addition, using the coupling mechanism to swap out loads of coffee roaster 108, one can insert a new load of green coffee beans shortly after removing the previous load of roasted coffee beans, thereby facilitating a high throughput of the roasting system. The shape of the heat duct of heat transfer system 104 can be of various types. For example, the cross section of the heat duct can be a rectangular or oval. The heat duct can also be a rigid or flexible structure. In one embodiment, heat transfer system 104 can include a mechanism that captures the ashes generated by heat source 102 while allowing heated air to be transferred to coffee roaster 108. Heat transfer system can further include one or more sensors that can detect the temperature, temperature changes, air flow, pressure, and/or other parameters to monitor the heat transfer process. Such sensor information can be transmitted to control module 106.

In one embodiment, Heat transfer system can include mechanisms, such as actuated vents, apertures, or registers, which can be controlled by control module 106 to regular the heat transfer process. Note that the regulatory operations applied to heat transfer system 104 by control module 106 can result in a faster response than the control operations applied to heat source 102. A combination of the control to heat source 102 and control to heat transfer system 104 can produce both a wide-range, slower adjustment to heat source 102 and a fast-response adjustment to heat transfer system 104.

Coffee roaster 108 can include a stirring mechanism that can move the coffee beans during the roasting process, thereby allowing the coffee beans to be roasted evenly. Coffee roaster 108 can also include a drum that can rotate and transfer the heat applied to the drum's surface to the coffee beans. Coffee roaster 108 can also include one or more sensors for collecting roasting-related parameters, such as temperature, moisture, air flow, and pressure. These roasting related parameters can be transmitted to control module 106, which can control coffee roaster 108 based on these sensor data and a pre-determined roasting profile. For example, control module 106 can send a control signal to heat transfer system 104 to open a vent in order to quickly lower the temperature of the host air delivered to coffee roaster 108, when the sensor within coffee roaster 108 detects a temperature among the coffee beans to be higher than a pre-determined value (which can be determined by the roasting profile) by a certain margin, or if the coffee bean temperature is higher than a predetermined value for longer than a predetermined time period.

Figure 2:
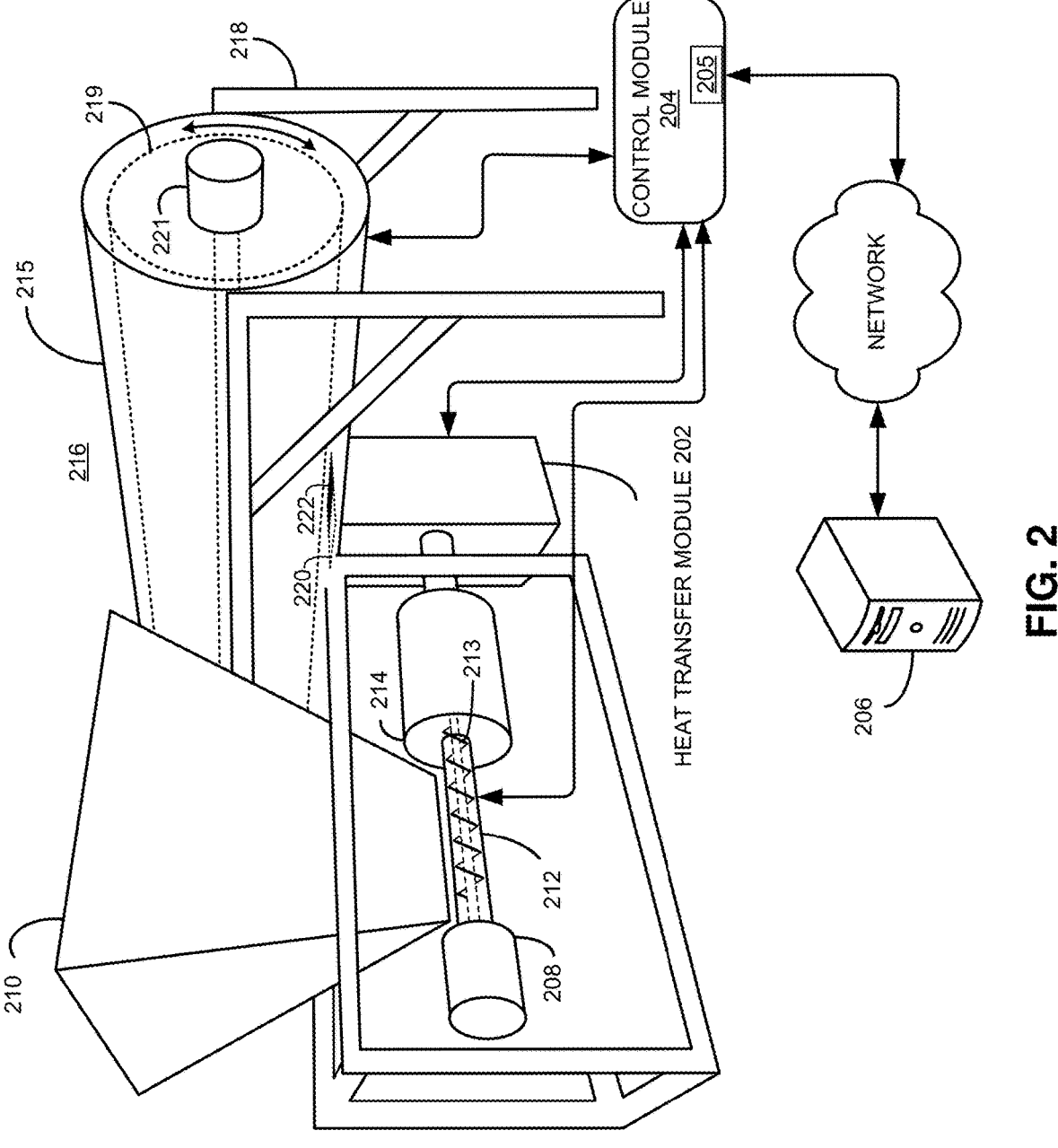
FIG. 2 illustrates an exemplary coffee bean roasting system in accordance with one embodiment of the present invention.

FIG. 2 illustrates an exemplary coffee bean roasting system in accordance with one embodiment of the present invention. In this example, the heat source can include a biomass fuel furnace 214. Furnace 214 can be coupled to a fuel conveyor mechanism 212, which can deliver the biomass fuel to furnace 214. In one embodiment, a motor 208 can be used to push the biomass fuel, which can be fed through a biomass fuel hopper 210, through fuel conveyor mechanism 212. Furthermore, furnace 214 can be coupled to a mechanism for injecting one or more helical air flows into the combustion chamber, which can optimize the combustion of organic materials and heat flow within the furnace. The dimensional design of furnace 214, which can include a ratio between the length and the radius of the furnace, can provide an optimized reaction rate for the combustion of the organic material. For example, a larger coffee roasters design can use larger dimensions of the furnace in order to inject the necessary amount of heat to achieve the level of roasting desired within the time frame desired.

In one embodiment, furnace 214 can have an internal auger 213, which can be held by an axis in such a way that auger 213 does not sag and is sufficiently sturdy to move organic material horizontally through the furnace at consistent pace, thereby allowing for a controlled combustion. The rotation of auger 213 can be controlled by a control module 204, based on the sensor data and a corresponding roasting profile. This horizontal auger-based fuel feeding mechanism allows bulk organic material to undergo a controlled combustion process.

The furnace can also include a thermocouple which provides temperature feedback from inside the furnace to control module 204. Thermal couples positioned along different locations of the furnace can also provide a differential between the start of the furnace and the end of the furnace, which allows control module 204 to determine how heat is being transferred during combustion of the organic material.

The system illustrated in FIG. 2 also includes a heat transfer module 202, which can provide heat to the center-bottom of a cylindrical roaster 216, thereby allowing heat to reach the inner roasting cylindrical drum (described below). Heat transfer module 202 can be removed from furnace 214 and/or coffee roaster 216 in order to disconnect furnace 214 from coffee roaster 216's cylindrical drum. This allows heat to be removed from the drum of roaster 216 to stop further roasting without having to turn furnace 214 off, thereby creating an efficient change over to the beginning of the next desired roast. In one embodiment, heat transfer module 202 also has an ash-catching tray such that the ash falls to the bottom and can be removed while the hot air rises to the top. This design provides an efficient, clean burning within the furnace and therefore reduces the amount of cleaning of furnace 214, heat transfer module 202, and cylindrical drum coffee roaster 216.

In one embodiment, coffee roaster 216 can have two cylindrical drums, which can be referred to as an outer shell 215 and inner shell 219s. Outer shell 215 can be fixed to a supporting structure 218. Inner shell 219 can be coupled to a motor 221 which causes the inner shell to rotate during the roasting process. Motor 221 can be configured to reverse the direction of rotation and can be controlled by control module 204 or be controlled manually. Inner shell 219 can rotate along an axle which connects the respective end caps of inner shell 219 through the corresponding end caps of outer shell 215. The axle can be driven by the motor to cause inner shell 219 to rotate. In one embodiment, the roasting drum which comprises inner shell 219 can include internal curvilinear fins, which allow the coffee beans inside the inner drum to be spread directionally based on the direction in which inner shell 219 rotates. For example, if inner shell 219 is rotating in one direction, the beans on the inside can travel towards the ends of inner shell 219 due to the movement of the curvilinear fins. Similarly, if inner shell 219 is rotating in the other direction, the beans on the inside can travel towards the center of inner shell 219. When inner shell 219 regularly changes its rotation direction, the rotation pattern can create a figure-8 flow pattern for the coffee beans during the roasting process.

Outer shell 215 can contain the heat that is injected by heat transfer module 202. The hot air which is trapped in the space between the outer shell 215 and inner shell 219 can then heat inner shell 219, which in turn heats the coffee beans inside inner shell 219. This design is different from conventional coffee roasters, which typically rely on convection to provide fastest transfer of heat. In comparison, embodiments of the present invention provide smooth and controlled heat transfer and allow the coffee beans inside inner shell 219 to undergo the desired heat and pressure for a controlled amount of time. Such accurate control of the roasting process facilitates the application of precise roasting profiles, especially roasting profiles with a lower temperature for a prolonged roasting time, which can produce coffee beans with low acidity levels and high antioxidant levels.

In one embodiment, for replacing beans into and removing beans from inner shell 219, openings can be positioned both at the top and bottom of outer shell 215 of roaster 216. The top opening can allow smoke to be released while maintaining minimal release of heat. A bottom opening 220 can have a sliding door mechanism 222, which can couple to heat transfer module 202. Inner shell 219 can have one opening, which can be used to refill inner shell 219 with green coffee beans when the opening is facing upwards, and be used to remove roasted beans when the opening if facing downwards. The inner shell opening can also have a sliding door mechanism. In addition to the roaster design described above, other roaster design and configurations can also be used in the present system. For example, one such roaster design is disclosed in U.S. Pat. No. 5,287,633, which is incorporated by reference herein.

In some embodiments, sensors used for collecting telemetry data can be positioned within the inner shell provide intelligent feedback to control module 204, which can in turn control furnace 214 and optionally heat transfer module 202. The telemetry data can include temperature and pressure data.

One important feature of the roasting system is control module 204. In one embodiment, control module 204 can monitor and control various components of the system, including different parts of the heat source (biomass fuel hopper 210, fuel conveyor mechanism 212, and air flow control of the furnace), heat transfer module 202, as well as coffee roaster 216. Furthermore, control module 204 can include a computer system that can run a software, which can be programmed to apply different roasting profiles. A roasting profile can specify various parameters for a roasting process to achieve a certain roasting effect. For example, a low-acidity roasting profile for a certain type of coffee beans can specify a series of temperature, air flow speed, bean stir speed, pressure, and time duration parameters for a series of roasting stages.

In addition, control module 204 can have a communication module 205 that is coupled to a network, such as the Internet, to communicate with a server 206. This network capability allows control module 204 to download various roasting profiles, which can be selected based on the type of green coffee beans to be roasted. Furthermore, the network capability allows control module 204 to update its software or firmware to improve the roasting system's performance and to report and correct potential errors. In some embodiments, a user can also use control module 204 to provide feedback associated with a roasting profile or process, which allows server 206 to update the corresponding roasting profile based on the collected feedback information. For example, after completing a low-acidity coffee roasting process, a user can test the roasted coffee for its pH value and provide this value as feedback to control module 204. Control module 204 can transmit this feedback information to server 206. Server 206 can subsequently collect multiple feedback reports from a number of roasting systems that have performed the same roasting profile and based on this collective feedback information determine whether the roasting profile needs to be updated (e.g., adjusting the temperature setting during certain roasting stage).

In an exemplary roasting process, the computer within control module 204 can respond to the temperature reading provided by the thermocouple in the furnace. The thermocouple can provide three readings, T1, T2, and the differential between T1 and T2 which is referred to as Delta temperature. The software running in control module 204 can read T1, T2, and Delta temperature, which have corresponding high and low limits as part of the parameters specified in a roasting profile. Note that the ranges of these parameters can be automatically set in the roasting profile, or can be set manually. Based on these ranges and readings, control module 204 can control the auger in the furnace to turn on or off the rotation, thereby providing a controlled feed rate of fuel into the furnace.

For starting up the furnace, different high and low temperatures can be desirable versus maintaining a constant temperature once the desired temperature is reached. These high and low settings can be specific to the organic material that is being used as fuel as well as the desired temperature that is ultimately desired within the furnace. Once telemetry information is received, the software can automatically run the auger dependent upon the desired temperature of the inner shell of the roaster in conjunction with the temperatures inside the furnace using differential thermodynamics. The control software can also account for the pressure readings to determine the feed rate of the auger in conjunction with the temperature readings. The control software can also control the motor which rotates the roaster inner shell at variable rates depending on the time of a given roasting stage. This allows for faster or slower heat dispersion among the coffee beans contained within the inner shell.

The control software can also include an artificial intelligence component that learns what is the desired final product and determine estimated time duration, temperature, and pressure settings for the coffee beans in the roaster in order to deliver the final product. Based on differential equations and constant pressure and temperature readings from the roaster inner shell, the control software can control the rotation of the inner shell and the feed rate of the auger for the furnace accordingly so the desired temperature and pressure is achieved and sustained for the allocated period, in order to provide the desired final product on a consistent basis.

Figure 3:
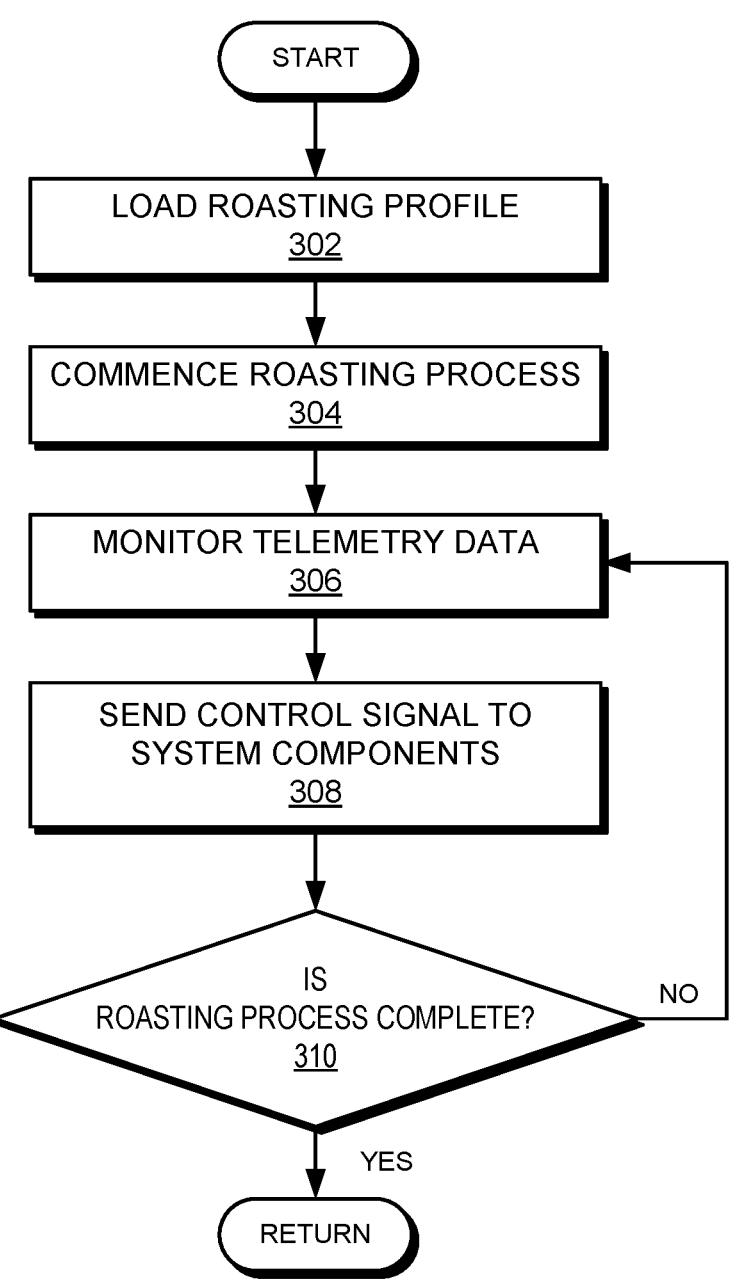
FIG. 3 presents a flow chart illustrating an exemplary roasting process, in accordance with an embodiment of the present invention.

FIG. 3 presents a flow chart illustrating an exemplary roasting process, in accordance with an embodiment of the present invention. During operation, the control module of the system first loads a roasting profile (operation 302). The roasting profile can be downloaded from a server over the Internet or be manually entered by a user. The roasting profile can specify roasting parameters, such as temperature, stir rate, air flow, pressure, and the corresponding time duration of one or more roasting stages of a roasting process.

Subsequently, assuming that the green coffee beans have been loaded into the roaster, the system commences the roasting process (operation 304), which can include connecting the heat transfer module to the roaster and optionally start the combustion process in the furnace if the combustion has not already been started.

Next, the control module of the system can receive telemetry data from sensors placed in different system components (operation 306). For example, such telemetry data can include the temperature and/or pressure within the inner shell of the roaster, the air flow in the heat transfer module, and the temperature and temperature differential in the furnace. Based on the received telemetry data and the parameters specified in the roasting profile, the control module can then send control signals to various components of the system (operation 308). For example, the control module can control the state of the rotation (on/off and direction) of the inner shell of the roaster, air flow of the furnace, and the auger rotation state for feeding fuel into the furnace. By controlling the state of these various components of the system, the control module can ensure that the parameters specified in the roasting profile are satisfied. Note that this feedback control mechanism can ensure a consistent quality of the final coffee product.

The system then determines whether the roasting process is complete (operation 310). If not, the system continues to monitor the telemetry data while controlling the roasting process. If the roasting process is complete, the system can stop the roasting process, upon which a user can de-couple the heat transfer module from the roaster and remove the coffee beans from the inner shell of the roaster.

The aforementioned roasting process can be performed automatically (by using a control module), semi-automatically, or manually. Note that in some embodiments, the coffee roasting system described herein can be used to produce low-acidity coffee beans without the use of chemical additives by, for example, roasting the coffee beans for an extended period of time, optionally at a reduced temperature. As a result of such extended roasting, the resulting coffee beans can exhibit a higher pH value (corresponding to lower acidity levels) and contain a higher level of antioxidants. In one embodiment, the disclosed system can be used roast coffee beans for a period longer than 120 minutes, to produce coffee beans with a pH value of 5.3 or higher, without using chemical additives such as potassium or sodium. In a further embodiment, the disclosed system can be used to roast coffee beans for a period longer than 180 minutes to produce coffee beans with a pH value of 5.5 or higher.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A coffee roasting system, comprising:
a roaster mechanism comprising an outer shell and an inner shell, wherein the outer shell is fixed to a supporting structure, and wherein the inner shell accommodates coffee beans;
a heat source comprising a fuel conveyor mechanism and a furnace, the fuel conveyor mechanism coupled to the furnace and comprising an auger to deliver fuel to the furnace, wherein combustion of the fuel occurs in the furnace;
a heat transfer mechanism coupled to the furnace via a first interface and coupled to the roaster mechanism via a second interface, wherein the second interface is positioned at a bottom of the outer shell of the roaster mechanism and comprises an opening with a sliding door mechanism, and wherein the heat transfer mechanism is removable from the roaster mechanism allowing heat from the heat source to be removed from the roaster mechanism; and
a control module coupled to the heat source and roaster mechanism.

2. The coffee roasting system of claim 1, wherein the auger rotates and delivers fuel to the furnace.

3. The coffee roasting system of claim 2, rotation of the auger is controlled by the control module.

4. The coffee roasting system of claim 1,
wherein the inner shell is coupled to a motor which causes the inner shell to rotate; and
wherein the motor is controlled by the control module.

5. The coffee roasting system of claim 1, wherein the control module is in communication with one or more sensors which collect one or more telemetry signals from the roaster mechanism, the heat source, or both.

6. The coffee roasting system of claim 1, wherein the control module comprises a communication module coupled to a network.

7. The coffee roasting system of claim 6, wherein the communication module is in communication with a server to download a roasting profile, and wherein the roasting profile indicates a set of roasting parameters for a roasting process.

* * * * *